(12) United States Patent
Terakawa et al.

(10) Patent No.: US 11,514,941 B2
(45) Date of Patent: Nov. 29, 2022

(54) MAGNETIC RECORDING MEDIUM HAVING CONTROLLED SATURATION FLUX DENSITY

(71) Applicant: Sony Corporation, Tokyo (JP)

(72) Inventors: Masaru Terakawa, Tokyo (JP); Minoru Yamaga, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/272,159

(22) PCT Filed: Sep. 5, 2019

(86) PCT No.: PCT/JP2019/035044
§ 371 (c)(1),
(2) Date: Feb. 26, 2021

(87) PCT Pub. No.: WO2020/050371
PCT Pub. Date: Mar. 12, 2020

(65) Prior Publication Data
US 2021/0350827 A1  Nov. 11, 2021

(30) Foreign Application Priority Data
Sep. 5, 2018  (JP) .............................. JP2018-166275

(51) Int. Cl.
*G11B 5/706* (2006.01)
*G11B 5/714* (2006.01)
*G11B 5/733* (2006.01)

(52) U.S. Cl.
CPC .......... *G11B 5/70678* (2013.01); *G11B 5/706* (2013.01); *G11B 5/714* (2013.01); *G11B 5/733* (2013.01)

(58) Field of Classification Search
None
See application file for complete search history.

(56) References Cited

U.S. PATENT DOCUMENTS 5,605,753 A * 2/1997 Sanada ..................... H01F 1/11
428/335
6,017,631 A * 1/2000 Yamamoto ............. G11B 5/855
428/407
(Continued)

FOREIGN PATENT DOCUMENTS

JP  2007-294086 A  11/2007
JP  2011100503 A  5/2011
(Continued)

OTHER PUBLICATIONS

Chapter One: Introduction to Ferrites (undated reference) (Year: 2022).*
(Continued)

*Primary Examiner* — Kevin M Bernatz
(74) *Attorney, Agent, or Firm* — K&L Gates LLP (57) ABSTRACT

A magnetic recording medium used on a record/playback device with a minimum recording wavelength or 50 nm or shorter, the magnetic recording medium including a magnetic layer that contains a spinel-type ferrite magnetic powder, the magnetic layer having an average thickness of 85 nm or smaller, and the magnetic layer having a saturation flux density of 1600 Gauss or larger and 2000 Gauss or smaller.

12 Claims, 1 Drawing Sheet

(56) References Cited

U.S. PATENT DOCUMENTS

| | | | |
|---|---|---|---|
| 2004/0106011 A1* | 6/2004 | Matsubaguchi | G11B 5/7021 |
| | | | 428/847.2 |
| 2004/0219392 A1* | 11/2004 | Zinbo | G11B 5/7358 |
| | | | 428/845.1 |
| 2009/0046396 A1* | 2/2009 | Nagata | G11B 5/70 |
| 2009/0091856 A1* | 4/2009 | Honda | G11B 5/00826 |
| | | | 428/832 |
| 2017/0162220 A1* | 6/2017 | Nakashio | G11B 5/78 |
| 2017/0186460 A1* | 6/2017 | Kasada | G11B 5/5928 |
| 2019/0027181 A1* | 1/2019 | Ozawa | G11B 5/00813 |

FOREIGN PATENT DOCUMENTS

| | | |
|---|---|---|
| JP | 2017-111842 A | 6/2017 |
| WO | 2015/198514 A1 | 12/2015 |

OTHER PUBLICATIONS

International Search Report dated Oct. 8, 2019 in connection with PCT/JP2019/035044.

* cited by examiner

MAGNETIC RECORDING MEDIUM HAVING CONTROLLED SATURATION FLUX DENSITY

TECHNICAL FIELD

The present disclosure relates to a magnetic recording medium.

BACKGROUND ART

With recent increase in data volume to be handled worldwide, coating-type magnetic recording medium has been more strongly required to have an enhanced capacity. For the enhanced capacity, there has been need for increasing recording track density or increasing linear recording density. In particular as the linear recording density increases, a magnetic layer needs to be thinned to adapt itself to recording at shorter wavelengths.

For example, Patent Document 1 describes that it is beneficial to thin the magnetic layer down to 200 nm or below, and particularly 100 nm or below, in order to cope with recording at shorter wavelengths which is indispensable for increasing the recording density.

CITATION LIST

Patent Document

Patent Document 1: Japanese Patent Application Laid-Open No. 2011-100503

SUMMARY OF THE INVENTION

Problems to be Solved by the Invention

The magnetic layer thus thinned would, however, attenuate the playback output of magnetic signal, and would consequently degrade electromagnetic conversion characteristics (signal-to-noise ratio (SNR), for example).

It is therefore an object of the present disclosure to provide a magnetic recording medium capable of attaining good electromagnetic conversion characteristics.

Solutions to Problems

In order to solve the issues described above, the present disclosure provides a magnetic recording medium used on a record/playback device with a minimum recording wavelength or 50 nm or shorter, the magnetic recording medium including a magnetic layer that contains a spinel-type ferrite magnetic powder, the magnetic layer having an average thickness of 85 nm or smaller, and the magnetic layer having a saturation flux density of 1600 Gauss or larger and 2000 Gauss or smaller.

Effects of the Invention

According to the present disclosure, good electromagnetic conversion characteristics are obtainable. It should be noted that the effect described here is not necessarily limitative and may be any effect described in the present disclosure or an effect different therefrom.

MODE FOR CARRYING OUT THE INVENTION

Embodiments of the present disclosure will be described in the following order.

1 Overview
2 Configuration of Magnetic Recording Medium
3 Method for Manufacturing Magnetic Powder
4 Method of Producing Magnetic Recording Medium
5 Effects

[1 Overview]

In recent years, barium-ferrite particle powder has widely been used as a magnetic powder for the magnetic recording medium. Saturation magnetization σs of the barium-ferrite particle powder is, however, around 50 emu/g at the largest, and would become short as the magnetic layer is thinned, possibly attenuating playback output of magnetic signal, and making it unable to obtain high SNR.

Even FeCo-based alloy (metal magnetic powder), although having been used as a magnetic powder having high saturation magnetization σs, may result in drastic fall of coercive force when pulverized, since the coercive force thereof relies upon its shape anisotropy. The FeCo-based alloy is, therefore, not suitable for high-density magnetic recording medium.

Considering these points, a magnetic recording medium according to an embodiment of the present invention employs, as the magnetic powder, a spinel-type ferrite particle powder with high saturation magnetization σs.

[2 Configuration of Magnetic Recording Medium]

Figure 1:
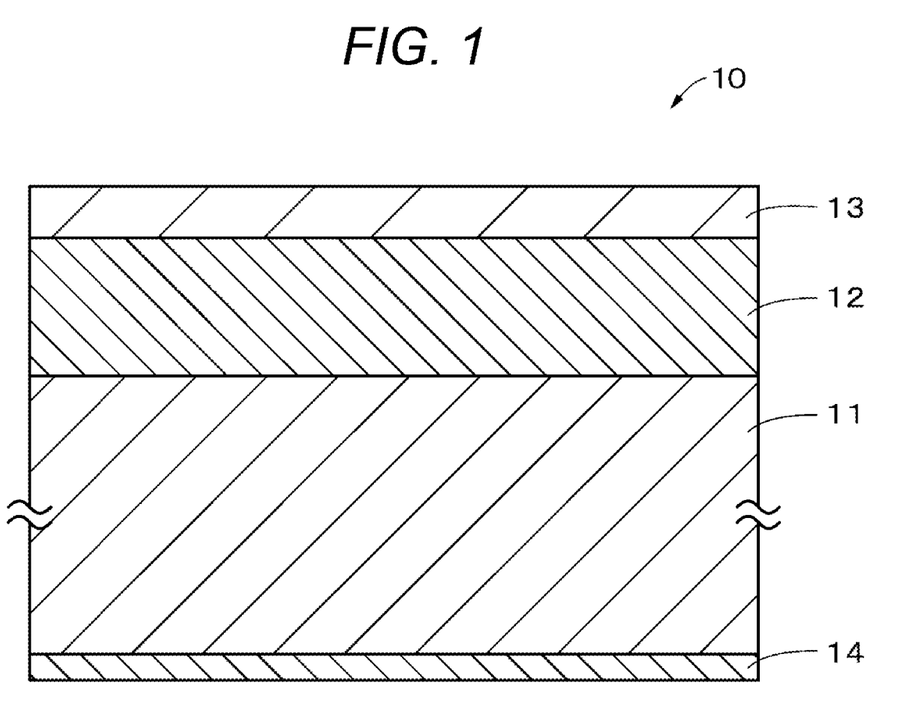
FIG. 1 is a cross-sectional view of a magnetic recording medium according to a first embodiment of the present disclosure.

First, a configuration of a magnetic recording medium 10 according to an embodiment will be described with reference to FIG. 1. The magnetic recording medium 10 includes an elongated substrate 11, an underlayer 12 provided on one main surface of the substrate 11, a magnetic layer 13 provided on the underlayer 12, and a back layer 14 provided on the other main surface of the substrate 11. Note that the underlayer 12 and the back layer 14 are provided as necessary, and do not necessarily need to be provided.

The magnetic recording medium 10 has a long tape shape, and is caused to travel in the longitudinal direction at the time of recording/playback. Note that the surface of the magnetic layer 13 is a surface on which a magnetic head is caused to travel. The magnetic recording medium 10 is configured to recording at a minimum recording wavelength of 50 nm or shorter, and of more preferably 46 nm or shorter, and is used on a record/playback device having a minimum recording wavelength of 50 nm or shorter, and of preferably 46 nm or shorter. The lower limit value of the minimum recording wavelength is preferably 30 nm or above, taking influence of size of the magnetic powder on transition width into consideration. Linear recording density of the magnetic recording medium 10 is preferably 500 kbpi or larger and 850 kbpi or smaller.

The minimum recording wavelength may be measured as described below. A magnetic recording medium 10 having data recorded over the entire area thereof is prepared, and a data recording pattern in a data band part of the recording layer 13 is observed under a magnetic force microscope (MFM), to obtain an MFM image. The MFM employable here is NANO SCOPE from Digital Instruments, with attached analytical software. A measurement area of the MFM image measures 2 μm×2 μm, and such 2 μm×2 μm measurement area is divided into 512×512 (=262,144) measurement points. Three 2 μm×2 μm measurement regions at different locations are observed under the MFM, and consequently three MFM images are obtained. On a two-dimensional irregularity chart representing recording patterns of the thus obtained MFM images, 50 inter-bit distances are measured. The inter-bit distance can be measured by using the software attached to NANOSCOPE. A value that gives an approximated greatest common divisor of the thus measured 50 inter-bit distances is defined as a minimum magnetization reversal distance L. Note that measurement conditions include scanning speed: 1 Hz, chip: MFMR from NanoWorld, lift height: 225 μm, and correction: Flatten order 3. The minimum recording wavelength can be determined by doubling the minimum magnetization reversal distance L.

The magnetic recording medium 10 is preferably used on a record/playback device equipped with a ring head as a recording head. The magnetic recording medium 10 may be used for library device. The library device in this case may have a plurality of the aforementioned record/playback devices.

Note that in the specification, "vertical direction" means a direction (thickness direction of the magnetic recording medium 10) perpendicular to the surface of the magnetic recording medium 10 in a flat state. The "longitudinal direction" means the longitudinal direction (travelling direction) of the magnetic recording medium 10.

(Substrate)

The substrate 11 is a non-magnetic support that supports the underlayer 12 and the magnetic layer 13. The substrate 11 has a long film shape. The upper limit value of the average thickness of the substrate 11 is favorably not more than 4.2 μm, more favorably not more than 3.8 μm, and still more favorably not more than 3.4 μm. In the case where the upper limit value of the average thickness of the substrate 11 is not more than 4.2 μm, the recording capacity of one data cartridge can be increased as compared with that of a general magnetic recording medium. The lower limit value of the average thickness of the substrate 11 is favorably not less than 3 μm. In the case where the lower limit value of the average thickness of the substrate 11 is not less than 3 μm, the reduction in strength of the substrate 11 can be suppressed.

The average thickness of the substrate 11 is obtained as follows. First, the magnetic recording medium 10 having a width of ½ inch is prepared and cut into a 250 mm length to prepare a sample. Subsequently, layers (i.e., the underlayer 12, the magnetic layer 13, and the back layer 14) of the sample other than the substrate 11 are removed with a solvent such as methyl ethyl ketone (MEK) or dilute hydrochloric acid. Next, the thickness of the sample (substrate 11) is measured at five or more points by using a laser hologauge manufactured by Mitutoyo Corporation as a measurement apparatus, and the measured values are simply averaged (arithmetic average) to calculate the average thickness of the substrate 11. Note that the measurement positions are randomly selected from the sample.

The substrate 11 contains, for example, at least one of polyesters, polyolefins, cellulose derivatives, vinyl resins, or other polymer resins. In the case where the substrate 11 contains two or more of the above-mentioned materials, the two or more materials may be mixed, copolymerized, or stacked.

The polyesters include, for example, at least one of polyethylene terephthalate (PET), polyethylene naphthalate (PEN), polybutylene terephthalate (PBT), polybutylene naphthalate (PBN), polycyclohexylenedimethylene terephthalate (PCT), polyethylene-p-oxybenzoate (PEB), or polyethylene bisphenoxy carboxylate.

The polyolefins include, for example, at least one of polyethylene (PE) and polypropylene (PP). The cellulose derivatives include, for example, at least one of cellulose diacetate, cellulose triacetate, cellulose acetate butyrate (CAB), and cellulose acetate propionate (CAP). The vinyl resins include, for example, at least one of polyvinyl chloride (PVC) and polyvinylidene chloride (PVDC).

The other polymer resins include, for example, at least one of polyamide (PA, nylon), aromatic polyamide (aromatic PA, aramid), polyimide (PI), aromatic polyimide (aromatic PI), polyamide imide (PAI), aromatic polyamide imide (aromatic PAI), polybenzoxazole (PBO, e.g., Zylon (registered trademark)), polyether, polyether ketone (PEK), polyether ester, polyether sulfone (PES), polyether imide (PEI), polysulfone (PSF), polyphenylene sulfide (PPS), polycarbonate (PC), polyarylate (PAR), or polyurethane (PU).

(Magnetic Layer)

The magnetic layer 13 is a recording layer for recording a signal. The magnetic layer 13 has magnetic anisotropy in the vertical direction. That is, the magnetic layer 13 has an axis of easy magnetization aligned in the vertical direction. The magnetic layer 13 contains, for example, a magnetic powder and a binder. The magnetic layer 13 may further contain, as necessary, at least one additive of a lubricant, an antistatic agent, an abrasive, a curing agent, a rust inhibitor, a non-magnetic reinforced particle, or the like.

The upper limit value of the average thickness of the magnetic layer 13 is favorably not more than 85 nm, more favorably not more than 70 nm, and still more favorably not more than 50 nm. In the case where the upper limit value of the average thickness of the magnetic layer 13 is not more than 85 nm, it is possible to improve the electromagnetic conversion characteristics (e.g., SNR) because the magnetization can be uniformly recorded in the thickness direction of the magnetic layer 13 in the case of using a ring-type head as a recording head.

The lower limit value of the average thickness of the magnetic layer 13 is favorably not less than 30 nm and more favorably not less than 35 nm. In the case where the upper limit value of the average thickness of the magnetic layer 13 is not less than 30 nm, it is possible to improve the electromagnetic conversion characteristics (e.g., SNR) because output can be secured in the case of using an MR-type head as a playback head.

The average thickness of the magnetic layer 13 is obtained as follows. First, the magnetic recording medium 10 is thinly processed perpendicular to the main surface thereof to prepare a test piece, and the cross section of the test piece is observed by using a transmission electron microscope (TEM). The apparatus and observation conditions are shown below.

Apparatus: TEM (H9000NAR manufactured by Hitachi. Ltd.)

Acceleration voltage: 300 kV

Magnification: 100,000

Next, the obtained TEM image is used for measuring the thickness of the magnetic layer 13 at at least 10 or more positions in the longitudinal direction of the magnetic recording medium 10, and then, the measured values are simply averaged (arithmetic average) to obtain the average thickness of the magnetic layer 13. Note that the measurement positions are randomly selected from the test piece.

The magnetic layer 13 preferably has a saturation flux density of 1600 Gauss or larger and 2000 Gauss or smaller, which is more preferably 1800 Gauss or larger and 1950 Gauss or smaller, and even more preferably 1850 Gauss or larger and 1900 Gauss or smaller. With the saturation flux density smaller than 1600 Gauss, the magnetic layer 13 will decrease the output as the layer is thinned, and would degrade the electromagnetic conversion characteristics (SNR, for example). Meanwhile, with the saturation flux density exceeding 2000 Gauss, a giant magnetoresistive (GMR) head, a tunneling magnetoresistive (TMR) head, or the like for reading magnetic signal will be saturated, and again the electromagnetic conversion characteristics (SNR, for example) would degrade.

The saturation flux density described above is obtained as follows. First, a measurement sample is cut out of the elongated magnetic recording medium 10, and an M-H loop of the entire measurement sample is measured in the vertical direction (thickness direction) of the measurement sample by using a vibrating sample magnetometer (VSM). Next, the coating films (the underlayer 12, the magnetic layer 13, the back layer 14, and the like) are wiped by using acetone, ethanol, or the like, leaving only the substrate 11 as a sample for background correction. The M-H loop of the substrate 11 is measured in the vertical direction (thickness direction) of the substrate 11 by using VSM. After that, the M-H loop of the substrate 11 is subtracted from the M-H loop of the entire measurement sample to obtain the M-H loop after background correction. The saturation magnetization $m_s$(emu) is obtained on the basis of the obtained M-H loop. Note that all of the above-mentioned M-H loops are measured at room temperature (25° C.). Further, "demagnetizing field correction" when measuring the M-H loop in the vertical direction of the magnetic recording medium 10 is not performed.

Next, volume v (=S×d) (cc) of the measurement sample is determined by using area S of the measurement sample used for measuring the M-H loop, and the average thickness d of the magnetic layer 13. Note that a method of calculating the average thickness d of the magnetic layer 13 has been described above. Then, by using the thus determined volume v (cc) and saturation magnetization ms (emu), the saturation magnetization ms (emu/cc) is calculated. Next, the thus calculated saturation magnetization ms is multiplied by 4π, to determine the saturation flux density.

(Magnetic Powder)

The magnetic powder contains a magnetic particle of iron oxide that has spinel-type ferrite as a main phase (referred to as "spinel-type ferrite magnetic particle", hereinafter). The spinel-type ferrite magnetic particle has cubic or nearly cubic shape, for example. In the description below, the magnetic powder that contains the spinel-type ferrite magnetic particle will be referred to as spinel-type ferrite magnetic powder.

The magnetic powder has uniaxial anisotropy, and is magnetically oriented in the vertical direction. Now the "uniaxial anisotropy" means uniaxial magnetocrystalline anisotropy. Owing to the uniaxial anisotropy, the magnetic powder can be magnetically oriented in the vertical direction in the process of forming the magnetic layer 13. With the magnetic powder magnetically aligned in the vertical direction, good electromagnetic conversion characteristics (SNR, for example) are obtainable. The magnetic powder may be manufactured, for example, by glass crystallization method.

The magnetic powder has an axis of easy magnetization aligned vertically or nearly vertically. That is, the magnetic powder is allowed to disperse in the magnetic layer 13, so that square face of the magnetic powder is aligned normal to, or nearly normal to the thickness direction of the magnetic layer 13. The cube-like, or nearly cube-like cubic ferrite magnetic powder can reduce contact area among the particles in the thickness direction of medium, and can be suppressed from aggregating, as compared with hexagonal barium ferrite magnetic powder. That is, the magnetic powder can be highly dispersed.

The spinel-type ferrite magnetic particle preferably exposes the square face to the surface of the magnetic layer 13. Short wavelength recording by using a magnetic head onto the square face of the spinel-type ferrite magnetic powder has an advantage over short wavelength recording onto hexagonal face of the hexagonal barium ferrite magnetic powder with the same volume, in terms of high density recording. Taking the high density recording into consideration, the surface of the magnetic layer 13 preferably has spread thereon the square faces of the spinel-type ferrite magnetic particle.

The magnetic powder preferably has an average particle size of 25 nm or smaller, which is more preferably 23 nm or smaller. In the magnetic recording medium 10, an actual magnetization area measures a half of recording wavelength. Hence, particularly excellent SNR is obtainable, by controlling the average particle size of the magnetic powder not larger than a half of the minimum recording wavelength. With the average particle size of the magnetic powder adjusted to 25 nm or smaller, particularly good SNR is obtainable in the magnetic recording medium 10 which is configured to record signals at a minimum recording wavelength of 50 nm or shorter. The lower limit value of the average particle size of the magnetic powder is, for example, 10 nm or above, although not specifically limited.

The average particle size of the magnetic powder described above may be determined as follows. First, the magnetic recording medium 10 to be measured is processed by focused ion beam (FIB) method or the like to obtain a thin strip, and a cross section of the strip is observed under a transmission electron microscope (TEM). Next, 500 magnetic particles are randomly chosen on a captured TEM photograph, individually measured to find the maximum particle size, and to find a particle size distribution of the maximum particle sizes of the magnetic powder. Now, the "maximum particle size" means so-called maximum Feret diameter, which more specifically means the largest distance between two parallel lines drawn so as to circumscribe the magnetic particle at all angles. After that, from the thus determined particle size distribution of the maximum particle size, a median diameter (50% diameter, D50) of the maximum particle size is then determined, which will be assumed as an average particle size (average maximum particle size) of the particle.

The spinel-type ferrite contained in the spinel-type ferrite magnetic particle is a cobalt-ferrite that contains Co. The cobalt-ferrite may further contain, besides Co, one or more elements selected from the group consisting of Ni, Mn, Al, Cu and Zn.

The cobalt-ferrite has an average chemical composition, for example, represented by formula (1) below.

$$Co_xM_yFe_2O_z \qquad (1)$$

(In formula (1), M represents one or more metals selected from the group consisting of Ni, Mn, Al, Cu and Zn, for example. x represents a value within the range of $0.4 \leq x \leq 1.0$. y represents a value within the range of $0 \leq y \leq 0.3$. Note that x and y satisfy a relation of $(x+y) \leq 1.0$. z represents a value within the range of $3 \leq z \leq 4$. A part of Fe may be substituted by other metal element.)

The magnetic particle preferably has a saturation magnetization σs of 53 emu/g or larger and 85 emu/g or smaller. Such large saturation magnetization σs is attributable to the spinel-type ferrite magnetic powder. Barium-ferrite magnetic powder can hardly give such large saturation magnetization σs. Although depending on the chemical composition of the magnetic layer 13, the magnetic layer 13 will successfully have a saturation flux density of 1600 Gauss or larger, when the saturation magnetization σs is 53 emu/g or larger, which is only as a guide. On the other hand, with the saturation magnetization σs adjusted to 85 emu/g or smaller, the magnetic layer 13 will have the saturation flux density limited to 2000 Gauss or smaller.

The saturation magnetization σs described above may be determined as follows. First, a magnetic powder sample in a predetermined shape is manufactured. The magnetic powder sample may be manufactured without special limitation, so long as it will not adversely affect the measurement such as packing into a measurement capsule or adhesion onto a measurement tape. Next, an M-H loop of the magnetic powder sample is obtained by using a VSM, and saturation magnetization σs is determined from the thus obtained M-H loop. Note that the M-H loop described above is measured in an environment at room temperature (25° C.).

Figure 2:
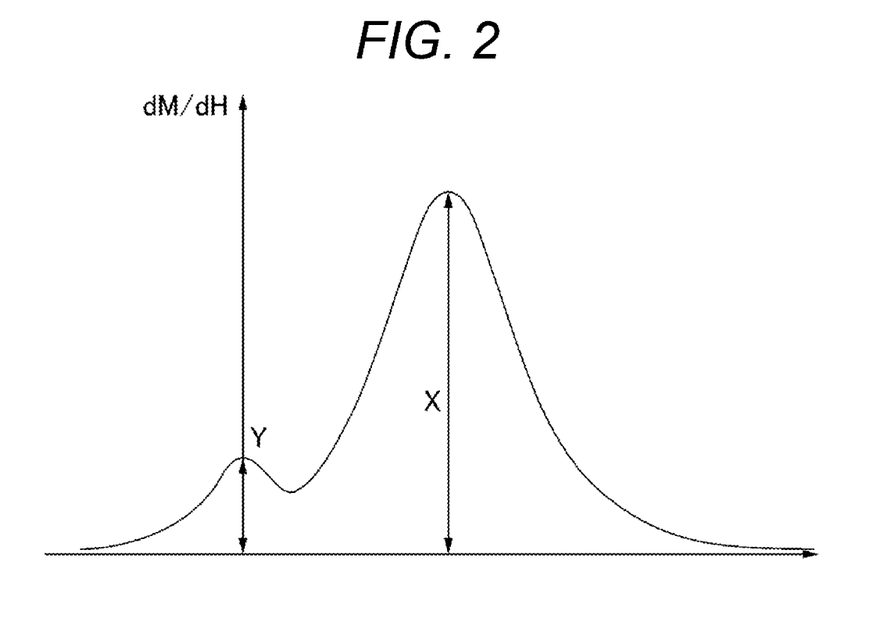
FIG. 2 is a graph showing an Example of an SFD curve.

In a switching field distribution (SFD) curve of the magnetic powder, ratio Y/X of height Y of a sub-peak at around a point of zero magnetic field, and height X of a main peak, is preferably 1.0 or smaller, more preferably 0.8 or smaller, and even more preferably 0.5 or smaller (see FIG. 2). With the ratio Y/X exceeding 1.0, variation of particle size of the magnetic powder will increase, possibly increasing variation in magnetic characteristics of the magnetic powder.

The ratio Y/X described above may be determined as follows, using a VSM or a superconducting quantum interference device (SQUID). First, the magnetic powder is sampled in a predetermined form. Mode of sampling is not specifically limited so long as it will not adversely affect the measurement, such as packing into a measurement capsule or adhesion onto a measurement tape. Next, an M-H loop of the magnetic powder sample is measured, and an SFD curve is then calculated from the thus obtained M-H loop. The SFD curve may be calculated by using a program product attached to the measuring instrument, or any other program product. Now, the M-H loop is measured at room temperature (25° C.). Next, letting an absolute value at a point where the obtained SFD curve intercepts the Y-axis (dM/dH) be "Y", and letting the height of a main peak observed at around the coercive force Hc in the M-H loop be "X", then the ratio Y/X is calculated.

(Binder)

Examples of the binder include a thermoplastic resin, a thermosetting resin, a reactive resin, and the like. Examples of the thermoplastic resin include vinyl chloride, vinyl acetate, a vinyl chloride-vinyl acetate copolymer, a vinyl chloride-vinylidene chloride copolymer, a vinyl chloride-acrylonitrile copolymer, an acrylate ester-acrylonitrile copolymer, an acrylate ester-vinyl chloride-vinylidene chloride copolymer, an acrylate ester-acrylonitrile copolymer, an acrylate ester-vinylidene chloride copolymer, a methacrylic acid ester-vinylidene chloride copolymer, a methacrylic acid ester-vinyl chloride copolymer, a methacrylic acid ester-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, nitrocellulose), a styrene butadiene copolymer, a polyurethane resin, a polyester resin, an amino resin, and synthetic rubber.

Examples of the thermosetting resin include a phenol resin, an epoxy resin, a polyurethane curable resin, a urea resin, a melamine resin, an alkyd resin, a silicone resin, a polyamine resin, a urea formaldehyde resin, and the like.

Further, in order to improve the dispersibility of the magnetic powder, polar functional groups such as $—SO_3M$, $—OSO_3M$, $—COOM$, $P=O(OM)_2$ (where M in the formula represents a hydrogen atom or an alkali metal such as lithium, potassium, and sodium), a side-chain amine having a terminal group represented by $—NR1R2$ or $—NR1R2R3^+X^-$, a main-chain amine represented by $>NR1R2^+X^-$ (where R1, R2, and R3 in the formula each represent a hydrogen atom or a hydrocarbon group, and $X^-$ represents a halogen element ion such as fluorine, chlorine, bromine, and iodine, or an inorganic or organic ion), $—OH$, $—SH$, $—CN$, and an epoxy group may be introduced into all the above-mentioned binders. The amount of polar functional groups introduced into the binder is favorably $10^{-1}$ to $10^{-8}$ mol/g and more favorably $10^{-2}$ to $10^{-6}$ mol/g.

(Lubricant)

Examples of the lubricant include an ester of a monobasic fatty acid having 10 to 24 carbon atoms and any of monohydric to hexahydric alcohols having 2 to 12 carbon atoms, a mixed ester thereof, a di-fatty acid ester, a tri-fatty acid ester, and the like. Specific example of the lubricant include lauric acid, myristic acid, palmitic acid, stearic acid, behenic acid, oleic acid, linoleic acid, linolenic acid, elaidic acid, butyl stearate, pentyl stearate, heptyl stearate, octyl stearate, isooctyl stearate, octyl myristate, and the like.

(Antistatic Agent)

Examples of the antistatic agent include carbon black, a natural surfactant, a nonionic surfactant, a cationic surfactant, and the like.

(Abrasive)

Examples of the abrasive include α-alumina with an alpha conversion rate of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, needle-like α-iron oxide obtained by dehydrating and annealing magnetic iron oxide starting material, and those obtained by performing surface treatment with aluminum and/or silica as necessary.

(Curing Agent)

Examples of the curing agent include polyisocyanate and the like. Examples of polyisocyanate include an aromatic polyisocyanate such as an adduct of tolylene diisocyanate (TDI) with and an active hydrogen compound, and an aliphatic polyisocyanate such as an adduct of hexamethylene diisocyanate (HMDI) with an active hydrogen compound. The weight average molecular weight of the polyisocyanates is favorably within the range of 100 to 3000.

(Rust Inhibitor)

Examples of the rust inhibitor include phenols, naphthols, quinones, heterocyclic compounds containing a nitrogen atom, heterocyclic compounds containing an oxygen atom, heterocyclic compounds containing a sulfur atom, and the like.

(Non-Magnetic Reinforced Particle)

Examples of the non-magnetic reinforced particle include aluminum oxide (α, β, or γ alumina), chromium oxide, silicon oxide, diamond, garnet, emery, boron nitride, titanium carbide, silicon carbide, titanium carbide, titanium oxide (rutile or anatase titanium oxide), and the like.

(Underlayer)

The underlayer 12 is used to moderate surface irregularity of the substrate 11, and to control the surface irregularity of the magnetic layer 13. The underlayer 12 may contain a lubricant, so as to allow it to supply the lubricant to the surface of the magnetic layer 13. The underlayer 12 is a non-magnetic layer containing a non-magnetic powder and a binder. The underlayer 12 may further contain, as necessary, at least one additive of a lubricant, an antistatic agent, a curing agent, a rust inhibitor, or the like.

The average thickness of the underlayer 12 is favorably not less than 0.6 µm and not more than 2.0 µm and more favorably not less than 0.8 µm and not more than 1.4 µm. Note that the average thickness of the underlayer 12 is obtained similarly to the average thickness of the magnetic layer 13. Note that the magnification of the TEM image is appropriately adjusted in accordance with the thickness of the underlayer 12.

(Non-Magnetic Powder)

The non-magnetic powder contains, for example, at least one of an inorganic particle powder or an organic particle powder. Further, the non-magnetic powder may contain a carbon powder such as carbon black. Note that one non-magnetic powder may be used alone, or two or more non-magnetic powders may be used in combination. The inorganic particle contains, for example, a metal, a metal oxide, a metal carbonate, a metal sulfate, a metal nitride, a metal carbide, a metal sulfide, or the like. Examples of the shape of the non-magnetic powder include, but not limited to, various shapes such as a needle shape, a spherical shape, a cubic shape, and a plate shape.

(Binder)

The binder is similar to that of the above-mentioned magnetic layer 13.

(Additive)

The lubricant, the antistatic agent, the curing agent, and the rust inhibitor are similar to those of the above-mentioned magnetic layer 13.

(Back Layer)

The back layer 14 contains a binder and a non-magnetic powder. The back layer 14 may further contain, as necessary, at least one additive of a lubricant, a curing agent, an antistatic agent, and the like. The lubricant and the antistatic agent are similar to those of the above-mentioned magnetic layer 13. Further, the non-magnetic powder is similar to that of the above-mentioned underlayer 12.

The average particle size of the non-magnetic powder is favorably not less than 10 nm and not more than 150 nm and more favorably not less than 15 nm and not more than 110 nm. The average particle size of the non-magnetic powder is obtained similarly to the average particle size of the above-mentioned magnetic powder. The non-magnetic powder may contain a non-magnetic powder having two or more types of particle size distribution.

The upper limit value of the average thickness of the back layer 14 is favorably not more than 0.6 µm. In the case where the upper limit value of the average thickness of the back layer 14 is not more than 0.6 µm, the thicknesses of the underlayer 12 and the substrate 11 can be kept thick even in the case where the average thickness of the magnetic recording medium 10 is not more than 5.6 µm. Therefore, the travelling stability of the magnetic recording medium 10 in the record/playback device can be maintained. The lower limit value of the average thickness of the back layer 14 is not particularly limited, but is, for example, not less than 0.2 µm.

The average thickness of the back layer 14 is obtained as follows. First, the magnetic recording medium 10 having a width of ½ inch is prepared and cut into a 250 mm length to prepare a sample. Next, the thickness of the sample is measured at five or more points by using a laser hologauge manufactured by Mitutoyo Corporation as a measurement apparatus, and the measured values are simply averaged (arithmetic average) to calculate an average thickness T [µm] of the magnetic recording medium 10. Note that the measurement positions are randomly selected from the sample. Subsequently, the back layer 14 of the sample is removed with a solvent such as methyl ethyl ketone (MEK) and dilute hydrochloric acid. After that, the above-mentioned laser hologauge is used again for measuring the thickness of the sample at five or more points, and the measured values are simply averaged (arithmetic average) to calculate an average thickness $T_1$ [µm] of the magnetic recording medium 10 from which the back layer 14 has been removed. Note that the measurement positions are randomly selected from the sample. After that, an average thickness t [µm] of the back layer 14 is obtained using the following formula.

$$T \, [\mu m] = T \, [\mu m] - T_1 \, [\mu m]$$

(Average Thickness of Magnetic Recording Medium)

The upper limit value of the average thickness (average total thickness) of the magnetic recording medium 10 is favorably not more than 5.6 µm, more favorably not more than 5.0 µm, and still more favorably not more than 4.4 µm. In the case where the average thickness of the magnetic recording medium 10 is not more than 5.6 µm, the recording capacity of one data cartridge can be increased as compared with that of a general magnetic recording medium. The lower limit value the average thickness of the magnetic recording medium 10 is not particularly limited, but is, for example, not less than 3.5 µm.

The average thickness of the magnetic recording medium 10 is obtained by the procedure described in the above-mentioned method of measuring the average thickness of the back layer 14.

(Total Thickness of Magnetic Layer and Underlayer)

The average thicknesses of the magnetic layer 13 and the underlayer 12 preferably total 1.1 µm or smaller, more preferably 0.8 µm or smaller, and even more preferably 0.6 µm or smaller. With the total of the average thicknesses of the magnetic layer 13 and the underlayer 12 adjusted to 1.1 µm or smaller, ratio of the magnetic layer 13 contained per unit volume will increase, and can enhance the volume capacity. The lower limit value of the total of the average thicknesses of the magnetic layer 13 and the underlayer 12 is preferably 0.3 µm or above, from the viewpoint of supply of a lubricant from the underlayer 12. The method for measuring the average thicknesses of the underlayer 12 and the magnetic layer 13 is as described previously.

(Coercive Force Hc)

The magnetic recording medium 10 preferably has the upper limit value of the coercive force Hc in the longitudinal direction of 2000 Oe or smaller, which is more preferably 1900 Oe or smaller, and even more preferably 1800 Oe or smaller. With the coercive force Hc in the longitudinal direction adjusted to 2000 Oe or smaller, good electromagnetic conversion characteristics (SNR, for example) is obtainable even in high-density recording.

The magnetic recording medium 10 preferably has a lower limit value of the coercive force Hc, measured in the longitudinal direction, of 1000 Oe or above. With the coercive force Hc, measured in the longitudinal direction, adjusted to 1000 Oe or larger, demagnetization due to leakage flux from the recording head may be suppressed.

The coercive force Hc described above may be determined as follows. First, an M-H loop after background correction is obtained in the similar way as the aforementioned method for measuring saturation flux density, except for that the M-H loop was measured in the longitudinal direction (travel direction) of the magnetic recording medium 10 and the substrate 11. Next, coercive force Hc is determined from the thus obtained M-H loop.

(Squareness Ratio)

The magnetic recording medium 10 has a squareness ratio $S_1$ in the vertical direction (thickness direction) of 65% or larger, which is preferably 70% or larger, and even more preferably 75% or larger. With the squareness ratio $S_1$ adjusted to 65% or larger, the magnetic powder will be vertically oriented to a sufficient degree, and further excellent electromagnetic conversion characteristics (SNR, for example) are therefore obtainable.

The squareness ratio Si may be determined as follows. First, an M-H loop after background correction is obtained, in the similar way as the aforementioned method for measuring saturation flux density. Next, saturation magnetization Ms (emu) and residual magnetization Mr (emu) read from the thus obtained M-H loop are substituted into an equation below, to calculate the squareness ratio Si (%).

Squareness ratio $S_1(\%)=(Mr/Ms)\times 100$

The magnetic recording medium 10 preferably has a squareness ratio $S_2$ in the longitudinal direction (travel direction) of 35% or smaller, which is more preferably 30% or smaller, and even more preferably 25% or smaller. With the squareness ratio $S_2$ adjusted to 35% or smaller, the magnetic powder will be vertically oriented to a sufficient degree, and therefore further excellent electromagnetic conversion characteristics (SNR) are obtainable.

The squareness ratio $S_2$ may be determined in the similar way as for squareness ratio $S_1$, except for that the M-H loop is measured in the longitudinal direction (travel direction) of the magnetic recording medium 10 and the substrate 11.

(SFD)

The magnetic recording medium 10 gives a switching field distribution (SFD) curve, in which ratio Y/X of height Y of a sub-peak at around a point of zero magnetic field, and height X of a main peak, is preferably 1.0 or smaller, more preferably 0.8 or smaller, and even more preferably 0.5 or smaller (see FIG. 2). With the peak ratio Y/X adjusted to 1.0 or smaller, it now becomes possible to suppress any low-coercive force ingredient, other than the spinel-type ferrite magnetic particle that actually contributes to recording, from becoming abundant in the magnetic powder. Hence, magnetic signals recorded in the adjacent tracks may be suppressed from being degraded due to leakage flux from the recording head, and more excellent electromagnetic conversion characteristics (SNR, for example) are obtainable.

The above-mentioned peak ratio Y/X is obtained as follows. First, an M-H loop after background correction is obtained, in the similar way as the aforementioned method for measuring saturation flux density. Next, an SFD curve is calculated on the basis of the obtained M-H loop. For the calculation of the SFD curve, a program attached to the measurement machine may be used, or another program may be used. Assumption is made that the absolute value of the point at which the calculated SFD curve crosses the Y axis (dM/dH) is "Y" and the height of the main peak seen in the vicinity of the coercive force Hc1 in the M-H loop is "X", the peak ratio Y/X is calculated.

(Activation Volume $V_{act}$)

An activation volume $V_{act}$ is favorably not more than 8000 nm³, more favorably not more than 6000 nm³, still more favorably not more than 5000 nm³, particularly favorably not more than 4000 nm³, and most favorably not more than 3000 nm³. In the case where the activation volume $V_{act}$ is not more than 8000 nm³, since the dispersion state of the magnetic powder is improved, the bit inversion region can be reduced, and it is possible to prevent the magnetization signal recorded in the adjacent track from being deteriorated due to the leakage magnetic field from the recording head. Therefore, it is possible to achieve more excellent electromagnetic conversion characteristics (e.g., SNR).

The above-mentioned activation volume $V_{act}$ is obtained by the following formula derived by Street&Woolley.

$$V_{act}(\text{nm}^3)=k_B\times T\times X_{irr}/(\mu_0\times Ms\times S)$$

(where $k_B$: Boltzmann's constant (1.38×10⁻²³ J/K), T: temperature (K), $X_{irr}$: irreversible magnetic susceptibility, $\mu_0$: vacuum permeability, S: magnetic viscosity coefficient, Ms: saturation magnetization (emu/cm³))

The irreversible magnetic susceptibility $X_{irr}$, the saturation magnetization Ms, and the magnetic viscosity coefficient S substituted into the above-mentioned formula are obtained as follows by using VSM. Note that the measurement direction by VSM is assumed to be the vertical direction. Further, the measurement by VSM is performed on the measurement sample cut out from the elongated magnetic recording medium 10 at room temperature (25° C.). Further, "demagnetizing field correction" when measuring the M-H loop in the vertical direction is not performed.

(Irreversible Magnetic Susceptibility $X_{irr}$)

The irreversible magnetic susceptibility $X_{irr}$ is defined as the slope in the vicinity of a residual coercive force Hr in the slope of the residual magnetization curve (DCD curve). First, a magnetic field of −1193 kA/m (15 kOe) is applied to the entire magnetic recording medium 10, and the magnetic field is returned to zero, thereby achieving a residual magnetization state. After that, a magnetic field of approximately 15.9 kA/m (200 Oe) is applied in the opposite direction, the magnetic field is returned to zero again, and the amount of residual magnetization is measured. After that, similarly, the measurement in which a magnetic field of 15.9 kA/m larger than the previous applied magnetic field is applied and the magnetic field is returned to zero is repeated, and the amount of residual magnetization is plotted against the applied magnetic field to measure the DCD curve. A point at which the amount of magnetization is zero in the obtained DCD curve is taken as the residual coercive force Hr, and the DCD curve is differentiated to obtain the slope of the DCD curve in each magnetic field. In the slope of the DCD curve, the slope near the residual coercive force Hr is $X_{irr}$.

(Saturation Magnetization Ms)

First, an M-H loop after background correction is obtained, in the similar way as the aforementioned method for measuring saturation flux density. Next, on the basis of the value of a saturation magnetization Ms (emu) of the obtained M-H loop and the volume (cm³) of the magnetic layer 13 in the measurement sample, Ms (emu/cm³) is calculated. Note that the volume of the magnetic layer 13 is obtained by multiplying the area of the measurement sample by the average thickness of the magnetic layer 13. The method of calculating the average thickness of the magnetic layer 13 necessary for calculating the volume of the magnetic layer 13 is as described above.

(Magnetic Viscosity Coefficient S)

First, a magnetic field of −1193 kA/m (15 kOe) is applied to the entire magnetic recording medium 10 (measurement sample), and the magnetic field is returned to zero, thereby achieving a residual magnetization state. After that, a magnetic field having a value similar to that of the residual coercive force Hr obtained from the DCD curve is applied in the opposite direction. In the state where the magnetic field is applied, the amount of magnetization is continuously measured at constant time intervals for 1000 seconds. The relationship between a time t and a magnetization amount M(t) thus obtained is compared with the following formula to calculate the magnetic viscosity coefficient S.

$$M(t)=M0+S\times\ln(t)$$

(where M(t): magnetization amount at time t, M0: initial magnetization amount, S: magnetic viscosity coefficient, ln(t): natural logarithm of time)

[3 Method for Manufacturing Magnetic Powder]

Next, a method for manufacturing the magnetic powder used for the magnetic layer 13 will be explained. The method for manufacturing the magnetic powder is a method for manufacturing a spinel-type ferrite magnetic powder, on the basis of a glass crystallization method that employs a glass-forming ingredient and an ingredient for forming a spinel-type ferrite magnetic powder (simply referred to as "magnetic powder-forming ingredient", hereinafter).

(Step of Mixing Starting Materials)

First, the glass-forming ingredient and the magnetic powder-forming ingredient are mixed to obtain a mixture.

The glass-forming ingredient contains sodium borate ($Na_2B_4O_7$). With sodium borate contained therein, the glass-forming ingredient can solubilize the magnetic powder-forming ingredient into glass, in the step of melting and amorphizing described later. Further, this can also moderate quenching condition for vitrification in the step of melting and amorphizing described later. This makes it possible to obtain an amorphous matter also by quenching a molten matter by placing it into water, rather than by quenching with use of a twin-roll quenching device. Moreover, in the after-mentioned step of isolating the magnetic powder, a crystallized glass (non-magnetic ingredient) may be removed by using hot water or the like, and the magnetic powder may be isolated.

Ratio of sodium borate, relative to the total amount of the glass-forming ingredient and magnetic powder-forming ingredient, is preferably 35 mol % or larger and 60 mol % or smaller. With the ratio of sodium borate adjusted to 35 mol % or larger, a highly uniform amorphous matter is obtainable. Meanwhile, with the ratio of sodium borate adjusted to 60 mol % or smaller, an obtainable amount of the magnetic powder can be suppressed from decreasing.

The glass-forming ingredient preferably contains at least one of alkali earth metal oxide and precursor of such oxide, in addition. With at least either alkali earth metal oxide or precursor of such oxide additionally contained therein, the glass-forming ingredient can elevate softening point of the glass, and can crystallize the magnetic powder-forming ingredient at around the glass softening point. This successfully suppresses the glass from being softened upon arrival at a crystallization temperature of the magnetic powder-forming ingredient, and suppresses the deposited magnetic powder from being sintered.

The alkali earth metal oxide contains, for example, at least one of calcium oxide (CaO), strontium oxide (SrO) and barium oxide (BaO). From among these oxides, at least one of strontium oxide and barium oxide is preferably contained in particular. This is because an effect of elevating glass softening point by aid of strontium oxide and barium oxide, is larger than an effect of elevating the glass softening point by aid of calcium oxide. Note that in a case where calcium oxide is used as the alkali earth metal oxide, it is preferable to use calcium oxide in combination with at least one of strontium oxide or barium oxide, in view of elevating the glass softening point.

The precursor of such alkali earth metal oxide is preferably a substance that produces alkali earth metal oxide under heating for melting, in the after-mentioned step of melting and amorphizing. Such substance is exemplified by carbonate salt of alkali earth metal, for example, but not limited thereto. The carbonate salt of alkali earth metal contains, for example, at least one of calcium carbonate ($CaCO_3$), strontium carbonate ($SrCO_3$) and barium carbonate ($BaCO_3$), and from among these oxides, preferably contains at least one of strontium carbonate and barium carbonate. The alkali earth metal oxide tends to be destabilized due to reaction with $CO_2$ or moisture in the air, so that, as the glass-forming ingredient, the precursor of alkali earth metal oxide (for example, carbonate salt of alkali earth metal), rather than alkali earth metal oxide, is used to enable precise weighing.

Molar ratio of alkali earth metal oxide relative to sodium borate (alkali earth metal oxide/sodium borate) is preferably 0.25 or larger and 0.5 or smaller. With the above-described molar ratio smaller than 0.25, the glass would have lowered glass softening point, and would be softened in the after-mentioned step of crystallization, before the magnetic powder will have a sufficient crystallinity. Hence, the deposited magnetic powder would be sintered, and the magnetic powder would have enlarged particle size. On the contrary, with the above-described molar ratio exceeding 0.5, the glass softening point would become too high, a hexagonal ferrite magnetic powder would deposit with the spinel-type ferrite magnetic powder, possibly expanding variation in coercive force Hc of the magnetic powder. Hence, the magnetic powder, when applied to the magnetic recording medium 10, would degrade S/N.

The magnetic powder-forming ingredient contains at least one of cobalt oxide (CoO) or a precursor of cobalt oxide, as well as iron oxide ($Fe_2O_3$). The precursor of cobalt oxide is preferably a substance that produces cobalt oxide under heating for melting in the after-mentioned step of melting and amorphizing. Such substance is exemplified by cobalt carbonate ($CoCO_3$), for example, but not specifically limited thereto.

(Step of Melting and Amorphizing)

Next, the thus obtained mixture is heated and melted at high temperatures (at around 1400° C., for example) to obtain a molten matter, and the molten matter is then quenched to obtain an amorphous matter (glassy matter). Any micro-crystal partially deposited in this stage is acceptable, if it will not grow so large in later annealing.

Applicable methods for quenching of the molten matter include liquid quenching such as metal twin-roll quenching and single-roll method; and a method for placing the molten matter into water. From the viewpoint of simplifying manufacturing equipment, preferred is the method of placing the molten matter into water.

(Step of Crystallization)

Next, the amorphous matter is annealed for crystallization in a heating device, so as to make the spinel-type ferrite magnetic powder deposit in the crystallized glass, to obtain a magnetic powder-containing matter. Since the magnetic powder in this stage deposits in the crystallized glass (non-magnetic ingredient), so that the particles are suppressed from sintering with each other, successfully yielding the magnetic powder with a micronized size. Also, since the amorphous matter is annealed at high temperatures, so that the magnetic powder with high crystallinity and high magnetization ($\sigma s$) is obtainable.

The annealing is conducted in an atmosphere with an oxygen concentration lower than in the air atmosphere. The annealing conducted in such atmosphere can increase coercive force Hc of the magnetic powder, and can impart uniaxial anisotropy to the magnetic powder. The oxygen partial pressure during the annealing is 1.0 kPa or lower, preferably 0.9 kPa or lower, even more preferably 0.5 kPa or lower, and yet more preferably 0.1 kPa or lower. Note that the oxygen partial pressure in the air atmosphere measures 21 kPa. With the oxygen partial pressure during the annealing kept at 1.0 kPa or below, the magnetic powder may have a coercive force Hc of 2500 Oe or larger. In order to make the annealing atmosphere have an oxygen concentration lower than in the air atmosphere, it suffices to introduce an inert gas such as nitrogen, Ar or the like into the heating device in which the amorphous matter is housed, or to evacuate the heating device by using a vacuum pump down to a reduced pressure.

Annealing temperature is preferably 500° C. or higher and 670° C. or lower, more preferably 530° C. or higher and 650° C. or lower, for example, at around 610° C. Annealing time is preferably 0.5 hours or longer and 20 hours or shorter, and more preferably 1.0 hour or longer and 10 hours or shorter.

The glass, which is a non-magnetic ingredient, preferably has the glass softening point close to the crystallization temperature of the magnetic powder-forming ingredient. If the glass softening point were low and largely distant from the crystallization temperature, the glass would soften upon arrival at the crystallization temperature of the magnetic powder-forming ingredient, possibly making the deposited magnetic powder more likely to be sintered, and magnetic powder would be oversized.

(Step of Isolating Magnetic Powder)

After that, the crystallized glass, which is a non-magnetic ingredient, is then removed, for example, by use of a weak acid or warm water, to isolate the magnetic powder. Therefore, the target magnetic powder is obtained in this way.

[4 Method of Producing Magnetic Recording Medium]

Next, the method of producing the magnetic recording medium 10 having the above-mentioned configuration will be described. First, a nonmagnetic powder, a binder, and the like are kneaded and dispersed in a solvent to prepare a coating material for forming an underlayer. Next, a magnetic powder, a binder, and the like are kneaded and dispersed in a solvent to prepare a coating material for forming a magnetic layer. For the preparation of the coating material for forming a magnetic layer and the coating material for forming an underlayer, for example, the following solvents, dispersing devices, and kneading devices can be used.

Examples of the solvent used for preparing the above-mentioned coating material include ketone solvents such as acetone, methyl ethyl ketone, methyl isobutyl ketone, and cyclohexanone, alcohol solvents such as methanol, ethanol, and propanol, ester solvents such as methyl acetate, ethyl acetate, butyl acetate, propyl acetate, ethyl lactate, and ethylene glycol acetate, ether solvents such as diethylene glycol dimethyl ether, 2-ethoxyethanol, tetrahydrofuran, and dioxane, aromatic hydrocarbon solvents such as benzene, toluene, and xylene, and halogenated hydrocarbon solvents such as methylene chloride, ethylene chloride, carbon tetrachloride, chloroform, and chlorobenzene. These may be used alone or mixed appropriately for use.

As the kneading device used for preparing the above-mentioned coating material, for example, kneading device such as a continuous twin-screw kneader, a continuous twin-screw kneader capable of performing dilution in multi-stages, a kneader, a pressure kneader, and a roll kneader can be used. However, the present technology is not particularly limited to these devices. Further, as the dispersing device used for preparing the above-mentioned coating material, for example, dispersing devices such as a roll mill, a ball mill, a horizontal sand mill, a vertical sand mill, a spike mill, a pin mill, a tower mill, a pearl mill (e.g., "DCP mill" manufactured by Nippon Eirich Co., Ltd.) a homogenizer, and an ultrasonic dispersion machine can be used. However, the present technology is not particularly limited to these devices.

Next, the coating material for forming an underlayer is coated on one main surface of the substrate 11 and dried to form the underlayer 12. Subsequently, the coating material for forming a magnetic layer is coated on the underlayer 12 and dried to form the magnetic layer 13 on the underlayer 12. Note that during drying, the magnetic field of the magnetic powder may be oriented in the thickness direction of the substrate 11 by, for example, a solenoid coil. Further, during drying, after the magnetic field of the magnetic powder may be oriented in the travelling direction (longitudinal direction) of the substrate 11 by, for example, a solenoid coil, the magnetic field of the magnetic powder may be oriented in the thickness direction of the substrate 11. After forming the magnetic layer 13, the back layer 14 is formed on the other main surface of the substrate 11. As a result, the magnetic recording medium 10 is obtained.

After that, the obtained magnetic recording medium 10 is rewound into a large diameter core, and curing treatment is performed thereon. Finally, calendaring treatment is performed on the magnetic recording medium 10, and then, it is cut into a predetermined width (e.g., width of ½ inch). In this way, the target elongated magnetic recording medium is obtained.

[5 Effects]

The magnetic recording medium 10 is used for a record/playback device with a minimum recording wavelength of 50 nm or shorter, and has the magnetic layer 13 that contains the spinel-type ferrite magnetic powder, in which the magnetic layer has an average thickness of 85 nm or smaller, and the magnetic layer 13 has a saturation flux density of 1600 Gauss or larger and 2000 Gauss or smaller. With this arrangement, good electromagnetic conversion characteristics (SNR, for example) are thus obtainable.

EXAMPLES

Hereinafter, the present disclosure will be specifically described by way of Examples. However, the present disclosure is not limited to only these Examples.

In EXAMPLES, average thickness of a base film (substrate), average thickness $t_1$ of the magnetic layer, average thickness $t_2$ of the underlayer, average thickness of the back layer, average thickness T of a magnetic tape (magnetic recording medium), saturation flux density $B_m$, squareness ratio Si in the vertical direction, squareness ratio $S_2$ in the longitudinal direction, and SFD of the magnetic powder are determined by the methods explained in the aforementioned embodiment.

Example 1

(Step of Mixing Starting Materials)

First, sodium borate ($Na_2B_4O_7$) and strontium carbonate ($SrCO_3$) which are glass forming ingredients, and iron oxide ($Fe_2O_3$) and cobalt carbonate ($CoCO_3$) which are magnetic powder forming ingredients were prepared. The thus prepared starting materials were mixed according to a molar proportion of $Na_2B_4O_7$: $SrCO_3$: $Fe_2O_3$: $CoCO_3$=44:16:24:16, to obtain a mixture.

(Step of Melting and Amorphizing)

Next, the thus obtained mixture was heated and melted at 1400° C. for one hour to obtain a molten matter, and the molten matter was then placed into water to obtain an amorphous matter (glassy matter). Note that during the heating described above, the strontium carbonate releases carbonic acid to yield strontium oxide. On the other hand, cobalt carbonate releases carbonic acid to yield cobalt oxide.

(Step of Crystallization)

Next, the thus obtained amorphous matter was annealed in an atmosphere with an oxygen partial pressure of 0.1 kPa at 610° C. for 1.5 hours for crystallization, to allow the cobalt-ferrite magnetic powder to deposit. With this arrangement, a magnetic powder-containing matter having cobalt-ferrite deposited in the crystallized glass was thus obtained.

(Step of Isolating Magnetic Powder)

After that, the crystallized glass, which is a non-magnetic ingredient, was then removed with hot water, to isolate a cobalt-ferrite magnetic powder ($CoFe_2O_4$). The thus isolated cobalt-ferrite magnetic powder was measured regarding the average particle size. The average particle size was consequently found to be 19 nm.

(Analysis by X-Ray Diffractometry)

The thus obtained cobalt-ferrite magnetic powder was analyzed by X-ray diffractometry. The result revealed that a peak assignable to cobalt-ferrite was confirmed, whereas peaks assignable to hexagonal ferrite and the non-magnetic ingredient (crystallized glass) were not confirmed. From these findings, the aforementioned step of crystallization was found to successfully suppress deposition of the hexagonal ferrite magnetic powder, and, the aforementioned step of isolating magnetic powder was found to successfully remove the crystallized glass with hot water.

(Step of Preparing Coating Material for Forming Magnetic Layer)

A coating material for forming a magnetic layer was prepared as follows. First, a first composition having the following formulation was kneaded by an extruder. Next, the kneaded first composition and a second composition having the following formulation were added to a stirring tank including a dispersing device, and, premixed. Subsequently, further sand mill mixing was performed, and filter treatment was performed to prepare a coating material for forming a magnetic layer.

(First Composition)

Magnetic powder (cobalt-ferrite magnetic powder obtained in the aforementioned step of manufacturing): 100 parts by mass Vinyl chloride resin (Cyclohexanone solution 30 mass %): 10 parts by mass (Degree of polymerization 300, Mn=10000, containing $OSO_3K$=0.07 mmol/g and secondary OH=0.3 mmol/g as polar groups)

Aluminum oxide powder: 5 parts by mass ($\alpha$-$Al_2O_3$, average particle diameter 0.2 μm)

Carbon black: 2 parts by mass (Manufactured by TOKAI CARBON CO., LTD., trade name: SEAST TA)

Note that the magnetic powder employed here was the cobalt-ferrite magnetic powder obtained as described above.

(Second Composition)

Vinyl chloride resin: 1.1 parts by mass (Resin solution: resin content 30 mass %, cyclohexanone 70 mass %)

n-butyl stearate: 2 parts by mass

Methyl ethyl ketone: 121.3 parts by mass

Toluene: 121.3 parts by mass

Cyclohexanone: 60.7 parts by mass

Finally, as curing agents, polyisocyanate (trade name: Coronate L manufactured by Tosoh Corporation): 4 parts by mass and myristic acid: 2 parts by mass were added to the coating material for forming a magnetic layer prepared as described above.

(Step of Preparing Coating Material for Forming Underlayer)

The coating material for forming an underlayer was prepared as follows. First, a third composition having the following formulation was kneaded by an extruder. Next, the kneaded third composition and a fourth composition having the following formulation were added to a stirring tank including a dispersion device, and premixed. Subsequently, further sand mill mixing was performed, and filter treatment was performed to prepare a coating material for forming an underlayer.

(Third Composition)

Acicular iron oxide powder: 100 parts by mass ($\alpha$-$Fe_2O_3$, average major axis length 0.15 μm)

Vinyl chloride resin: 55.6 parts by mass (Resin solution: resin content 30 mass %, cyclohexanone 70 mass %)

Carbon black: 10 parts by mass (Average particle diameter 20 nm)

(Fourth Composition)

Polyurethane resin UR 8200 (manufactured by TOYOBO CO., LTD.): 18.5 parts by mass n-butyl stearate: 2 parts by mass Methyl ethyl ketone: 108.2 parts by mass Toluene: 108.2 parts by mass Cyclohexanone: 18.5 parts by mass Finally, as curing agents, polyisocyanate (trade name: Coronate L manufactured by Tosoh Corporation): 4 parts by mass and myristic acid: 2 parts by mass are added to the coating material for forming an underlayer prepared as described above.

(Step of Preparing Coating Material for Forming Back Layer)

A coating material for forming a back layer was prepared as follows. The following starting materials were mixed in a stirring tank including a dispersion device, and filter treatment was performed to prepare the coating material for forming a back layer.

Carbon black (manufactured by ASAHI CARBON CO., LTD, trade name: #80): 100 parts by mass Polyester polyurethane: 100 parts by mass (Manufactured by Nippon Polyurethane Industry Co., Ltd., trade name: N-2304)

Methyl ethyl ketone: 500 parts by mass

Toluene: 400 parts by mass

Cyclohexanone: 100 parts by mass (Film Forming Step)

By using the coating prepared as described above, a magnetic tape was manufactured as described below. First, a PEN film (base film) having an elongated form and an average thickness of 4.0 μm was prepared as a support. Next, the underlayer-forming coating was coated over the PEN film, followed by drying, to form an underlayer having an average thickness $t_2$ after calendering of 1.015 μm, on one main face of the PEN film. Next, the magnetic layer-forming coating was coated over the underlayer, followed by drying, to form a magnetic layer having an average thickness $t_1$ after calendering of 85 nm, on the underlayer. Note that, in the process of drying the magnetic layer-forming coating, the magnetic powder was magnetically aligned in the thickness direction of the PEN film, by using a solenoid coil. Also drying conditions (drying temperature and drying time) for the magnetic layer-forming coating were controlled, so as to adjust the squareness ratio Si in the vertical direction to 70%, and the squareness ratio $S_2$ in the longitudinal direction to 30%.

Subsequently, the coating material for forming a back layer was coated on the other main surface of the PEN film and dried to form a back layer having the average thickness of 0.4 μm after calendaring treatment. Then, curing treatment was performed on the PEN film on which the underlayer, the magnetic layer, and the back layer were formed. After that, calendaring treatment was performed to smooth the surface of the magnetic layer.

(Step of Cutting)

The magnetic tape obtained as described above was cut into a width of ½ inch (12.65 mm). Therefore, a magnetic tape having the elongated form and the average thickness T of 5.5 μm was obtained.

Example 2

A magnetic tape was obtained in the similar way as in Example 1, except that the annealing temperature during synthesis of the magnetic powder was lowered, so as to adjust the saturation flux density $B_m$ to 1650 Gauss.

Example 3

A magnetic tape was obtained in the similar way as in Example 2, except that the average thickness $t_1$ of the magnetic layer after calendering was adjusted to 70 nm, and the average thickness of the underlayer after calendering was adjusted to 1.030 μm.

Example 4

A magnetic tape was obtained in the similar way as in Example 2, except that the average thickness $t_2$ of the underlayer after calendering was adjusted to 0.915 μm.

Example 5

A magnetic tape was obtained in the similar way as in Example 2, except that the drying conditions (drying temperature and drying time) of the magnetic layer-forming coating were controlled, so as to adjust the squareness ratio Si in the vertical direction to 60%, and the squareness ratio $S_2$ in the longitudinal direction to 40%.

Example 6

A magnetic tape was obtained in the similar way as in Example 2, except that the drying conditions (drying temperature and drying time) of the magnetic layer-forming coating were controlled, so as to adjust the squareness ratio Si in the vertical direction to 65%, and the squareness ratio $S_2$ in the longitudinal direction to 35%.

Example 7

A cobalt-ferrite magnetic powder ($Co_{0.7}Cu_{0.3}Fe_2O_4$) was obtained in the similar way as the method for manufacturing the magnetic powder in Example 1, except that copper oxide was added as a starting material. A magnetic tape was obtained in the similar way as in Example 2, except that such magnetic powder was used.

Example 8

A cobalt-ferrite magnetic powder ($Co_{0.7}Zn_{0.3}Fe_2O_4$) was obtained in the similar way as the method for manufacturing the magnetic powder in Example 1, except that zinc oxide was added as a starting material. A magnetic tape was obtained in the similar way as in Example 2, except that such magnetic powder was used.

Example 9

A cobalt-ferrite magnetic powder ($Co_{0.7}Mn_{0.3}Fe_2O_4$) was obtained in the similar way as the method for manufacturing the magnetic powder in Example 1, except that manganese oxide was added as a starting material. A magnetic tape was obtained in the similar way as in Example 2, except that such magnetic powder was used.

Example 10

A magnetic tape was obtained in the similar way as in Example 2, except that the average thickness $t_1$ of the magnetic layer after calendering was adjusted to 70 nm, and the average thickness of the underlayer after calendering was adjusted to 1.130 μm.

Comparative Example 1

A magnetic tape was obtained in the similar way as in Example 1, except that the annealing temperature during synthesis of the magnetic powder was adjusted, so as to adjust the saturation flux density $B_m$ to 1500 Gauss.

Comparative Example 2

A magnetic tape was obtained in the similar way as in Example 1, except that the annealing temperature during synthesis of the magnetic powder was adjusted, so as to adjust the saturation flux density $B_m$ to 1400 Gauss.

Comparative Example 3

A magnetic tape was obtained in the similar way as in Comparative Example 1, except that the average thickness $t_1$ of the magnetic layer after calendering was adjusted to 90 nm, and the average thickness $t_2$ of the underlayer after calendering was adjusted to 1.010 μm.

Comparative Example 4

A magnetic tape was obtained in the similar way as in Comparative Example 1, except that the average thickness $t_2$ of the underlayer after calendering was adjusted to 1.115 μm.

Comparative Example 5

A magnetic tape was obtained in the similar way as in Comparative Example 1, except that the drying conditions (drying temperature and drying time) of the magnetic layer-forming coating were controlled, so as to adjust the squareness ratio Si in the vertical direction to 55%, and the squareness ratio $S_2$ in the longitudinal direction to 45%.

Comparative Example 6

A magnetic tape was obtained in the similar way as in Comparative Example 1, except that the drying conditions (drying temperature and drying time) of the magnetic layer-forming coating were controlled, so as to adjust the squareness ratio Si in the vertical direction to 60%, and the squareness ratio $S_2$ in the longitudinal direction to 40%.

Comparative Example 7

A magnetic tape was obtained in the similar way as in Example 2, except that the average thickness $t_1$ of the magnetic layer after calendering was adjusted to 90 nm, and the average thickness $t_2$ of the underlayer after calendering was adjusted to 1.010 μm.

(SNR)

Electromagnetic conversion characteristics (SNR) of the magnetic tape in a 25° C. atmosphere was measured, using a ½-inch tape drive (MTS Transport, from Mountain Engineering II, Inc.) having a record/playback head and a record/playback amplifier attached thereto. The recording head employed here was a ring head with a gap length of 0.2 μm, and a playback head employed here was a GMR head having an intershield distance of 0.1 μm. The relative speed was adjusted to 6 m/s, the recording clock frequency was adjusted to 160 MHz (recording wavelength=100 nm), and the recording track width was adjusted to 2.0 μm. Further, the SNR was calculated according to a method described in the literature below. The results were given as relative values assuming SNR in Example 2 as 1 dB, and summarized in Table 1.

Y. Okazaki: "An Error Rate Emulation System.", IEEE Trans. Man., 31, pp. 3093-3095 (1995)

Here, the reason why the recording wavelength is not 50 nm but 100 nm is as follows. That is, in a recording/playback system using a short wavelength, in general, an output/noise ratio at the time of recording/playback at a recording wavelength twice the minimum recording wavelength is often used as SNR. Further, SNR at the doubled recording wavelength has a high correlation with an error rate as compared with SNR at the minimum recording wavelength. Further, in the case where SNR was measured at the minimum recording wavelength, depending on the wavelength characteristics of the recording/playback system, tape noise is hidden by system noise of the recording/playback system, and noise characteristics of the medium are not correctly reflected in some cases. In particular, in the case of recording with high linear recording density, the noise characteristics of the medium are not correctly reflected in many cases.

Table 1 shows configurations and evaluation results of Examples 1 to 10 and Comparative Examples 1 to 7.

TABLE 1

| | Magnetic powder | | | $t_1$ [nm] | $t_2$ [μm] | $t_1 + t_2$ [μm] | T [μm] | $B_m$ [Gauss] | $S_1$ [%] | $S_2$ [%] | SFD | SNR characteristics |
|---|---|---|---|---|---|---|---|---|---|---|---|---|
| | Composition | Particle shape | Presence/absence of uniaxial anisotropy | | | | | | | | | |
| Example 1 | $CoFe_2O_4$ | Cubic | Present | 85 | 1.015 | 1.1 | 5.5 | 1800 | 70 | 30 | 0.9 | 1.4 |
| Example 2 | $CoFe_2O_4$ | Cubic | Present | 85 | 1.015 | 1.1 | 5.5 | 1650 | 70 | 30 | 0.9 | 1 |
| Example 3 | $CoFe_2O_4$ | Cubic | Present | 70 | 1.030 | 1.1 | 5.5 | 1650 | 70 | 30 | 0.9 | 1.4 |
| Example 4 | $CoFe_2O_4$ | Cubic | Present | 85 | 0.915 | 1 | 5.4 | 1650 | 70 | 30 | 0.9 | 1 |
| Example 5 | $CoFe_2O_4$ | Cubic | Present | 85 | 1.015 | 1.1 | 5.5 | 1650 | 60 | 40 | 0.9 | 0.5 |
| Example 6 | $CoFe_2O_4$ | Cubic | Present | 85 | 1.015 | 1.1 | 5.5 | 1650 | 65 | 35 | 0.9 | 0.8 |
| Example 7 | $Co_{0.7}Cu_{0.3}Fe_2O_4$ | Cubic | Present | 85 | 1.015 | 1.1 | 5.5 | 1650 | 70 | 30 | 0.8 | 1.2 |
| Example 8 | $Co_{0.7}Zn_{0.3}Fe_2O_4$ | Cubic | Present | 85 | 1.015 | 1.1 | 5.5 | 1650 | 70 | 30 | 0.8 | 1.3 |
| Example 9 | $Co_{0.7}Mn_{0.3}Fe_2O_4$ | Cubic | Present | 85 | 1.015 | 1.1 | 5.5 | 1650 | 70 | 30 | 0.8 | 1.2 |
| Example 10 | $CoFe_2O_4$ | Cubic | Present | 70 | 1.130 | 1.2 | 5.6 | 1650 | 70 | 30 | 0.9 | 1 |
| Comparative example 1 | $CoFe_2O_4$ | Cubic | Present | 85 | 1.015 | 1.1 | 5.5 | 1500 | 70 | 30 | 0.9 | −0.1 |
| Comparative example 2 | $CoFe_2O_4$ | Cubic | Present | 85 | 1.015 | 1.1 | 5.5 | 1400 | 70 | 30 | 0.9 | −0.5 |
| Comparative example 3 | $CoFe_2O_4$ | Cubic | Present | 90 | 1.010 | 1.1 | 5.5 | 1500 | 70 | 30 | 0.9 | −0.3 |
| Comparative example 4 | $CoFe_2O_4$ | Cubic | Present | 85 | 1.115 | 1.2 | 5.6 | 1500 | 70 | 30 | 0.9 | −0.1 |
| Comparative example 5 | $CoFe_2O_4$ | Cubic | Present | 85 | 1.015 | 1.1 | 5.5 | 1500 | 55 | 45 | 0.9 | −1.1 |
| Comparative example 6 | $CoFe_2O_4$ | Cubic | Present | 85 | 1.015 | 1.1 | 5.5 | 1500 | 60 | 40 | 0.9 | −0.6 |
| Comparative example 7 | $CoFe_2O_4$ | Cubic | Present | 90 | 1.010 | 1.1 | 5.5 | 1650 | 70 | 30 | 0.9 | −0.1 |

$t_1$: average thickness of the magnetic layer
$t_2$: average thickness of the underlayer
T: average thickness of magnetic recording medium
$B_m$: saturation flux density
$S_1$: squareness ratio in the vertical direction (without demagnetizing field correction)
$S_2$: squareness ratio in the longitudinal direction (travelling direction)

The followings became clear from Table 1.

The magnetic tape, for use on the record/playback device having a minimum recording wavelength of 50 nm or shorter, can achieve good SNR, when (1) it has a magnetic layer that contains a cobalt-ferrite magnetic powder, (2) the magnetic layer has an average thickness $t_1$ of 85 nm or smaller, and (3) the magnetic layer has a saturation flux density $B_m$ of 1600 Gauss or larger.

For further improvement in SNR, the magnetic layer preferably has a saturation flux density $B_m$ of 1800 Gauss or larger (see Examples 1, 2).

For further improvement in SNR, the magnetic tape preferably has a squareness ratio in the longitudinal direction of 35% or smaller, which is more preferably 30% or smaller (see Examples 2, 5, 6).

For further improvement in SNR, the magnetic tape preferably has a squareness ratio in the vertical direction of 65% or larger, which is more preferably 70% or larger (see Examples 2, 5, 6).

For further improvement in SNR, the average thicknesses of the magnetic layer and the underlayer preferably total 1.1 µm or smaller (see Examples 3, 10).

Although embodiments of the present disclosure and modified examples thereof have been specifically described above, the present disclosure is not limited to the above-mentioned embodiments and modified examples thereof and various modifications can be made on the basis of the technical idea of the present disclosure.

For example, the configurations, the methods, the steps, the shapes, the materials, and the numerical values cited in the above-mentioned embodiments and modified examples thereof are only illustrative, and different configurations, methods, steps, shapes, materials, numerical values, and the like may be used as necessary. Further, the chemical formulae of compounds and the like are representative, and are not limited to the described valences and the like as long as they are common names of the same compound.

Further, the configurations, the methods, the steps, shapes, the materials, the numerical values, and the like in the above-mentioned embodiments and modified examples thereof can be combined without departing from the essence of the present disclosure.

Further, the present disclosure may also take the following configurations.

(1)

A magnetic recording medium used on a record/playback device with a minimum recording wavelength or 50 nm or shorter, the magnetic recording medium including:

a magnetic layer that contains a spinel-type ferrite magnetic powder, the magnetic layer having an average thickness of 85 nm or smaller, and the magnetic layer having a saturation flux density of 1600 Gauss or larger and 2000 Gauss or smaller.

(2)

The magnetic recording medium according to (1), in which the spinel-type ferrite magnetic powder has uniaxial magnetic anisotropy.

(3)

The magnetic recording medium according to (1) or (2), in which the spinel-type ferrite magnetic powder is oriented in a thickness direction of the magnetic layer.

(4)

The magnetic recording medium according to any one of (1) to (3), in which the spinel-type ferrite magnetic powder contains a cubic or nearly cubic magnetic particle, and a square face of the magnetic particle exposes out from the surface of the magnetic layer.

(5)

The magnetic recording medium according to (4), in which the surface of the magnetic layer has spread thereon the square faces of the magnetic particle.

(6)

The magnetic recording medium according to any one of (1) to (5), in which the spinel-type ferrite magnetic powder is cobalt-ferrite magnetic powder.

(7)

The magnetic recording medium according to any one of (1) to (6), in which the spinel-type ferrite magnetic powder has an average size of 25 nm or smaller.

(8)

The magnetic recording medium according to any one of (1) to (7), having an average thickness of 5.6 µm or smaller.

(9)

The magnetic recording medium according to any one of (1) to (8), further including an underlayer arranged below the magnetic layer, in which average thicknesses of the magnetic layer and the underlayer total 1.1 µm or smaller.

(10)

The magnetic recording medium according to any one of (1) to (9), having a squareness ratio in the vertical direction of 65% or larger.

(11)

The magnetic recording medium according to any one of (1) to (10), in which the magnetic recording medium has an elongated form, and the magnetic recording medium has a squareness ratio in a longitudinal direction of 35% or smaller.

(12)

The magnetic recording medium according to any one of (1) to (11), in which the magnetic recording medium has an elongated form, and the magnetic recording medium has a coercive force in a longitudinal direction of 2000 Oe or smaller.

REFERENCE SIGNS LIST

10 Magnetic recording medium
11 Substrate
12 Underlayer
13 Magnetic layer
14 Back layer

The invention claimed is:

1. A magnetic recording medium used on a record/playback device with a minimum recording wavelength or 50 nm or shorter, the magnetic recording medium comprising:

a magnetic layer that contains a spinel-type ferrite magnetic powder, the magnetic layer having an average thickness of 85 nm or smaller, and the magnetic layer having a saturation flux density of 1600 Gauss or larger and 2000 Gauss or smaller.

2. The magnetic recording medium according to claim 1, wherein the spinel-type ferrite magnetic powder has uniaxial magnetic anisotropy.

3. The magnetic recording medium according to claim 1, wherein the spinel-type ferrite magnetic powder is oriented in a thickness direction of the magnetic layer.

4. The magnetic recording medium according to claim 1, wherein the spinel-type ferrite magnetic powder contains a cubic or nearly cubic magnetic particle, and a square face of the magnetic particle exposes out from the surface of the magnetic layer.

5. The magnetic recording medium according to claim 4, wherein the surface of the magnetic layer has spread thereon the square faces of the magnetic particle.

6. The magnetic recording medium according to claim 1, wherein the spinel-type ferrite magnetic powder is cobalt-ferrite magnetic powder.

7. The magnetic recording medium according to claim 1, wherein the spinel-type ferrite magnetic powder has an average size of 25 nm or smaller.

8. The magnetic recording medium according to claim 1, having an average thickness of 5.6 µm or smaller.

9. The magnetic recording medium according to claim 1, further comprising
an underlayer arranged below the magnetic layer, wherein average thicknesses of the magnetic layer and the underlayer total 1.1 µm or smaller.

10. The magnetic recording medium according to claim 1, having a squareness ratio in the vertical direction of 65% or larger.

11. The magnetic recording medium according to claim 1, wherein
the magnetic recording medium has an elongated form, and
the magnetic recording medium has a squareness ratio in a longitudinal direction of 35% or smaller.

12. The magnetic recording medium according to claim 1, wherein
the magnetic recording medium has an elongated form, and
the magnetic recording medium has a coercive force in a longitudinal direction of 2000 Oe or smaller.

* * * * *